和name="United States Patent Office"

3,423,179
Patented Jan. 21, 1969

3,423,179
CATALYST FOR GROWTH OF BORON CARBIDE CRYSTAL WHISKERS
James E. Webb, Administrator of the National Aeronautics and Space Administration with respect to an invention of Robert F. Cree, Ballston Lake, N.Y., and Arno Gatti, Norristown, Pa.
No Drawing. Filed June 22, 1966, Ser. No. 560,967
U.S. Cl. 23—208                    10 Claims
Int. Cl. C01b 31/30; C22c 29/00; B01j 7/00

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to the production of boron carbide ($B_4C$) whiskers and more particularly to a method of increasing whisker growth and population during vapor deposition techniques. Specifically this invention is directed to the use of vanadium and other catalytic elements to enhance the yields of boron carbide whiskers from either boron carbide powder vaporization or gas phase boron carbide producing reactions.

In recent years considerable experimental emphasis has been directed to the production of ultra strong filaments for use in composite materials whereby high strength and high modulus characteristics are obtained while light weight is maintained. A number of filamentary materials have been proposed for inclusion in such composites including boron carbide but the lack of availability of this material in whisker form has limited its application.

It has been proposed that boron carbide whiskers be produced by a number of techniques including pure vapor and chemical reaction methods. The pure vapor method involves the vaporization and condensation of boron carbide under temperatures between 1700° C. and 2100° C. and substantial vacuums (25–100$\mu$) whereby whiskers grow on a condensation surface. This technique has been applied either with or without carrier gases such as hydrogen; with the carrier gas higher pressures on the order of 800$\mu$ being used.

The chemical reaction method is based on the gas phase reaction:

$$4BCl_3 + CH_4 + 4H_2 \rightleftharpoons B_4C + 12HCl$$

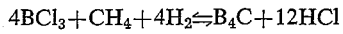

In operation, all three reactants are passed through a furnace at temperatures ranging from 1450° C.–1900° C. and at pressures varying from 10$\mu$ to 150$\mu$ with deposition occurring on a mandrel placed in the furnace.

Both of these methods are described in a number of published reports which include complete disclosures of operating parameters, furnace designs and whisker product characteristics. Among such reports are: Gatti et al., "The Synthesis of Boron Carbide Filaments," Final Report—Prepared for the National Aeronautics & Space Administration Under Contract NASw–670, Space Sciences Laboratory—Missile & Space Division, General Electric Co., July 10, 1964.

The above methods are not totally satisfactory for boron carbide whisker production for it has not been possible to obtain uniformly good whisker growth with all samples of boron carbide powders utilized in the pure vapor technique while the chemical reaction method generally produces a poor whisker product. It has been observed that samples of boron carbide powder which initially have good whisker producing properties exhaust such attributes during extended vaporization runs. Changes in chamber geometry, reaction temperatures and pressures have led to some improvement but a consistently satisfactory procedure has not been available to solve the above problems.

Therefore it is an object of the present invention to provide a technique for obtaining consistently satisfactory whisker growth in vapor deposition of boron carbide.

It is a further object of the instant invention to provide a procedure for enhancing whisker growth of boron carbide which is adaptable for use in either the pure vapor or chemical reaction methods.

It is still a further object of the instant invention to provide a method of improving boron carbide whisker production which does not require any modification of existing deposition apparatus or variation of previously developed optimum conditions of temperature and pressure.

A still further object of the present invention is to present a method of consistent whisker manufacture which may be applied with all samples of boron carbide powders without any deleterious effects due to impurities present therein.

It is still a further object of the present invention to provide a technique for restoring whisker producing activity to exhausted boron carbide powder compositions.

These and other objects will become apparent from the following detailed description and claims.

In brief it has been discovered that certain metals, particularly vanadium and to some degree molybdenum and niobium exhibit a catalytic type effect on the deposition of boron carbide whiskers from the gas phase. These metals may be incorporated directly into boron carbide powders utilized in the pure vapor technique which either never possessed or which have lost their whisker producing activity or applied as a decomposable gas such as a vanadium tetrachloride in the chemical reaction method.

It is not completely understood how these metals act to enhance to boron carbide whisker formation. It was noted, however, that the boron carbide whiskers produced by the technique of the instant invention, using vanadium catalyst, when analyzed by X-ray fluorescence show trace presence of vanadium throughout their entire structure.

The specific amounts of vanadium, molybdenum or niobium to be added to provide whisker producing capabilities of boron carbide powders may vary over a wide range from the trace amounts of about .01% found in commercial boron carbide powders up to about 2 weight percent or greater based on the weight of the boron carbide powders used in the pure vapor technique. The trace amounts found in the commercial preparation appeared due to the grinding technique wherein metal balls containing vanadium provide the crushing action. The use of excess amounts of vanadium do not effect whisker growth since they are vaporized from the system quite rapidly. Similar amounts provide a catalytic effect in the chemical reaction method. In this case a decomposable catalytic compound such as vanadium tetrachloride, niobium pentachloride or molybdenum pentachloride are utilized in catalytic amounts which may vary from trace presences up to substantial partial pressures. Generally it is preferred to utilize 1–5 mol percent of catalyst based on the totals mols of reaction gas present.

Except for the presence of the catalytic amount of vanadium, niobium or molybdenum, the procedures for whisker growth are as described in the Gatti et al. report referred to above or as modified by subsequent developments in apparatus and techniques as completely described in the following identically titled more recent publications: Gatti et al., "Study of the Growth Parameters Involved in Synthesizing Boron Carbide Filaments," NASACR 251 (July 1965), and GE 214–269 (Mar. 1, 1966). (Prepared under Contract Nos. NASw–937 and NASw–1205 respectively by General Electric Company for the National Aeronautics & Space Administration.)

Having generally described the instant invention, following are specific examples showing how the technique thereof may be applied.

Example I

Boron carbide powder (Fisher Scientific Co., −320 mesh) was analyzed by semi-quantitative spectrograph which showed the trace presence of a large number of impurities including Fe, Al, Ca, Si, Cr, Ni, Cu, Mn, Ti, W, V and Mg. This powder was placed in a "lazy susan" crucible which was surrounded by a deposition mandrel; this combination being placed in a 24″ diameter large furnace as disclosed in the Gatti et al. 1964 report at pages 11, 12, 16 and 17. A series of deposition experiments were conducted using a hot zone temperature of 1950° C. under 50μ vacuum, each run being for five hours.

Upon cooling and release of vacuum after each run the whisker build-up in the deposition mandrel was observed. A constant decrease in boron carbide whisker size and population from 20 mm. sizes in the first run to no substantial boron carbide whisker growth or population in the fifth run was noted.

One weight percent vanadium metal powder was added to the boron carbide powder remaining after the fifth run and a sixth run made under identical conditions to the first five runs. The result was a rejuvenation of whisker growth and population to the level of both population and size obtained during the first run.

Example II

Two runs were made utilizing the chemical reaction method. Both were conducted in a 1 inch diameter by 8 inch long ATJ graphite deposition mandrel placed in a small furnace as described in the 1964 Gatti et al. report at pages 11 and 12 (FIG. 4). Temperature was maintained at 1650° C. for the five hour duration of each run with average pressures of about 75μ. In both runs a stoichiometric mixture of $BCl_3$, $CH_4$ and $H_2$ was flowed through the reactor at a flow rate of 72 cc./min. (32 cc./min. $BCl_3$–8 cc./min. $CH_4$–32 cc./min. $H_2$). In the second run the conditions were identical with the exception that 1 cc./min. of vanadium tetrachloride was added to the reaction mixture.

The first run yielded only poorly developed whiskers while the second produced a band of well defined boron carbide whiskers on the furnace tube said whiskers measuring approximately 10μ in diameter and having an average length of about 50μ.

Studies were conducted utilizing either niobium or molybdenum in place of vanadium in both the pure vapor and chemical reaction methods and although the improvement with these materials was not as pronounced as that noted with vanadium, there was a clear evidence of catalytic effect with these other two metals resulting in substantial improvements in whisker production.

Investigations of other metals generally considered to possess similar properties to vanadium showed no catalytic activity for boron carbide whisker deposition. Some of the metals tested included, chromium, titanium, zirconium, iron, copper and silicon.

The boron whiskers produced by the method of the instant invention are quite useful in the manufacture of a number of composite structures. They can be incorporated in both metal and plastics whereby a structure is produced having greatly increased strength and modulus without weight increase. Such composite structures find ready applications in such environments as space vehicles where this combination of properties is so essential.

As many widely different embodiments of the invention may be made without departing from the spirit and scope thereof, it is understood that the invention is not limited to the specific embodiments thereof except as defined by the appended claims.

What is claimed is:

1. In a process of vapor deposition of boron carbide whiskers from a boron carbide source composition selected from the group consisting of non-whisker producing boron carbide powders and boron carbide producing gaseous reaction mixtures, the improvement comprising increasing the whisker producing activity of the source composition by incorporating therein a catalytic amount of a member selected from the group consisting of vanadium, niobium and molybdenum, and maintaining said catalytic amount in said composition during boron carbide whisker deposition.

2. A method according to claim 1 wherein the composition is boron carbide powder and the catalyst is vanadium in amounts of at least .01 weight percent.

3. A method according to claim 2 wherein the deposition is effected in a vacuum furnace at a temperature of about 1950° C. and a pressure of about 50μ.

4. A method according to claim 1 wherein the composition is boron carbide powder and the catalyst is niobium.

5. A method according to claim 1 wherein the composition is boron carbide powder and the catalyst is molybdenum.

6. A method according to claim 2 wherein the deposition is effected in a vacuum furnace in the presence of hydrogen carrier gas at a pressure of about 800μ.

7. A method according to claim 1 wherein the composition is a stoichiometric mixture of boron tetrachloride, methane and hydrogen and the catalyst is vanadium supplied to the composition as vanadium tetrachloride.

8. A method according to claim 7 wherein the vapor deposition is effected in a vacuum at about 1650° C. and a pressure of about 75μ.

9. A method according to claim 1 wherein the composition is a stoichiometric mixture of boron tetrachloride, methane and hydrogen and the catalyst is niobium supplied to the composition as niobium pentachloride.

10. A method according to claim 1 wherein the composition is a stoichiometric mixture of boron tetrachloride, methane and hydrogen and the catalyst is molybdenum supplied to the composition as molybdenum pentachloride.

References Cited

UNITED STATES PATENTS

| 3,189,412 | 6/1965 | Wood et al. | 23—191 |
| 3,253,886 | 5/1966 | Lamprey et al. | 23—208 X |
| 3,334,967 | 8/1967 | Bourdeau | 23—208 |
| 3,340,020 | 9/1967 | Neuenschwander et al. | 23—208 X |

FOREIGN PATENTS

| 740,547 | 11/1955 | Great Britain. |
| 898,403 | 6/1962 | Great Britain. |

OSCAR R. VERTIZ, *Primary Examiner.*

G. T. OZAKI, *Assistant Examiner.*

U.S. Cl. X.R.

23—294